US007672691B2

(12) United States Patent
Kim et al.

(10) Patent No.: US 7,672,691 B2
(45) Date of Patent: Mar. 2, 2010

(54) SIM/UIM CARD ARRANGEMENT IN PORTABLE WIRELESS TERMINAL

(75) Inventors: Hyung-Chan Kim, Suwon-si (KR); Ju-Hwan Lee, Suwon-si (KR); Jae-Woo Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 351 days.

(21) Appl. No.: 11/233,646

(22) Filed: Sep. 23, 2005

(65) Prior Publication Data

US 2006/0079283 A1 Apr. 13, 2006

(30) Foreign Application Priority Data

Oct. 8, 2004  (KR) ...................... 10-2004-0080170

(51) Int. Cl.
*H04B 1/38* (2006.01)
*H04M 1/00* (2006.01)

(52) U.S. Cl. .................... 455/558; 455/90.3; 455/575.4

(58) Field of Classification Search .............. 455/575.8, 455/558, 575.3, 575.4, 90.3, 347, 348; 361/814
See application file for complete search history.

(56) References Cited

U.S. PATENT DOCUMENTS

| 6,724,618 | B1 * | 4/2004 | Jenkins et al. ............. 361/684 |
| 7,194,289 | B1 * | 3/2007 | Flores, Jr. ................ 455/575.1 |
| 2003/0153356 | A1 * | 8/2003 | Liu ........................... 455/558 |
| 2004/0043752 | A1 * | 3/2004 | Matsumura ................ 455/405 |

FOREIGN PATENT DOCUMENTS

| EP | 0 679 002 | 10/1995 |
| EP | 0 944 219 | 9/1999 |
| JP | 2002342720 | 11/2002 |
| KR | 10-2005-117354 | 12/2005 |

* cited by examiner

*Primary Examiner*—Quochien B Vuong
(74) *Attorney, Agent, or Firm*—The Farrell Law Firm, LLP

(57) ABSTRACT

There is provided a SIM (Subscriber Identity Module)/UIM (User Identity Module) card arrangement in a slide type portable wireless terminal having a main body and a slide body sliding by a predetermined length in a lengthwise direction of the terminal to slide up and down on the main body. In the arrangement, when the slide body is fully slid up, a SIM (Subscriber Identity Module)/UIM (User Identity Module) card is installed on a rear surface, which is open to the view, of the slide body.

14 Claims, 3 Drawing Sheets

SIM/UIM CARD ARRANGEMENT IN PORTABLE WIRELESS TERMINAL

PRIORITY

This application claims priority under 35 U.S.C. § 119 to an application entitled "SIM/UIM Card Arrangement In Slide Type Portable Wireless Terminal" filed in the Korean Intellectual Property Office on Oct. 8, 2004 and assigned Ser. No. 2004-0080170, the contents of which are incorporated herein by reference.

BACKGROUND OF THE INVENTION

1. Field of the Invention

The present invention relates to a user identification card arrangement in a portable wireless terminal, and more particularly, to an effective arrangement of a slide type terminal in which any one or all of a Subscriber Identity Module (SIM) card for a European Global System for Mobile (GSM) telecommunication terminal and a User Identity Module (UIM) card for a Code Division Multiple Access (CDMA) terminal is arranged or are concurrently arranged.

2. Background of the Prior Art

Generally, user information and terminal system-related information are stored in a detachable Subscriber Identity Module (SIM) card for a European GSM wireless terminal or a detachable User Identity Module (UIM) card for a CDMA wireless terminal (Hereinafter, a user identity card is the general term of the SIM card and the UIM card). The SIM card and the UIM card stores the user's information. For example, the user's call details, user preferences, system information and the like. Accordingly, a user can store his information on a card and transfer it between devices.

Recently, a terminal has been developed that is used in both CDMA and GSM systems and allows exchanging of the SIM card and the UIM card. The SIM card and the UIM card are generally installed at the rear surface of a terminal main body. In other words, a SIM card socket and a UIM card socket are provided at a rear surface of the terminal body, and a corresponding card is mounted into its corresponding socket to allow operation of the terminal.

However, the SIM card and the UIM card are not the only components installed at the rear surface of the terminal main body. A battery pack usually is installed on top of the SIM/UIM card, blocking its access. Accordingly, there is an inconvenience in that the user has to take the battery pack out before accessing the SIM/UIM card, and re-install the battery pack.

SUMMARY OF THE INVENTION

Accordingly, the present invention is directed to a user/subscriber identity module card arrangement in a portable wireless terminal, which substantially obviates one or more problems due to limitations and disadvantages of the related art.

An object of the present invention is to provide a user/subscriber identity module card arrangement in a portable wireless terminal in which a user/subscriber identity module card can be simply and conveniently separated or detached.

Another object of the present invention is to provide a user/subscriber identity module card arrangement in a portable wireless terminal in which a user/subscriber identity module card can be simply exchanged or mounted even without separating a battery pack from a body.

A further object of the present invention is to provide a user/subscriber identity module card arrangement in a portable wireless terminal in which a user/subscriber identity module card is installed on a slide body where a battery pack is not installed, such that the user/subscriber identity module card is easily exchanged and detached without unnecessarily detaching the battery pack.

To achieve the object and other advantages, according to one aspect of the present invention, there is provided a SIM (Subscriber Identity Module)/UIM (User Identity Module) card arrangement in a slide type portable wireless terminal having a main body, and a slide body sliding by a predetermined length in a lengthwise direction of the terminal to slide up and down on the main body, wherein when the slide body is fully slid up, a SIM/UIM card is installed on a rear surface, which is open to the view, of the slide body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in, and constitute a part of, this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Also, when it is determined that the subject of the invention may be ambiguous by a detailed description, the detailed description will be omitted.

Figure 1:
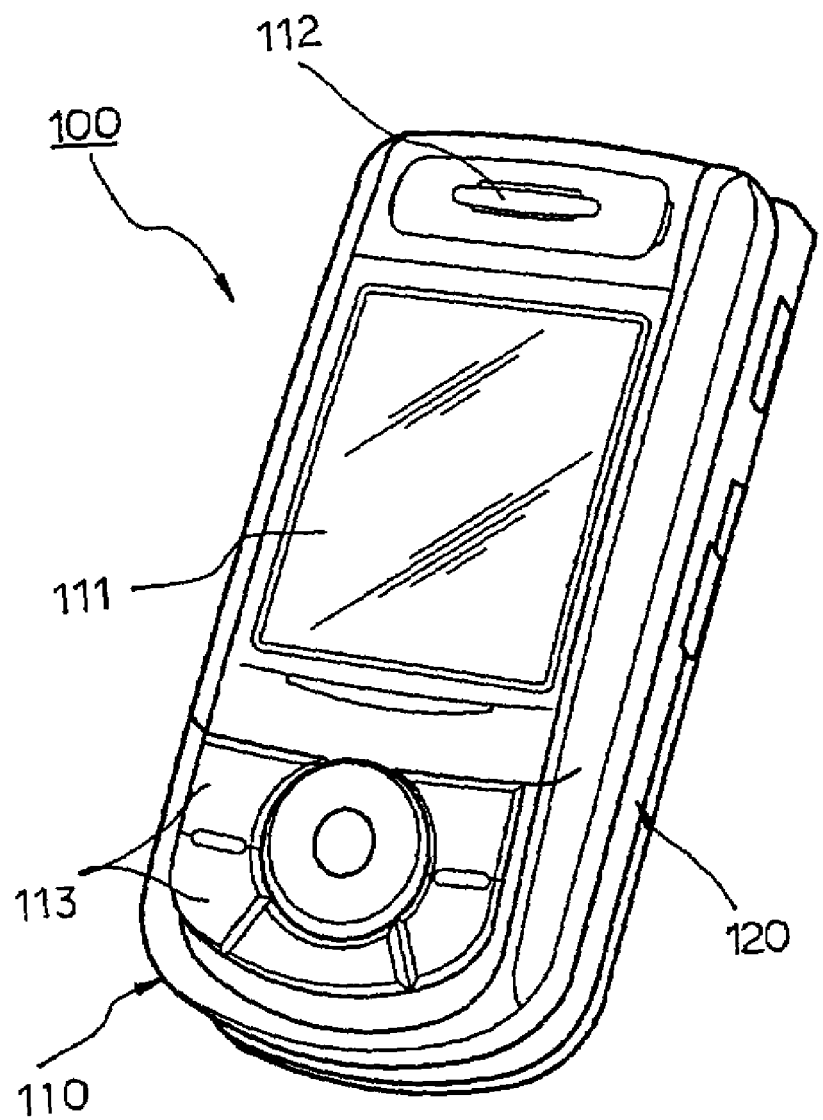
FIG. 1 is a perspective view illustrating a conventional slide type portable wireless terminal.
Figure 2:
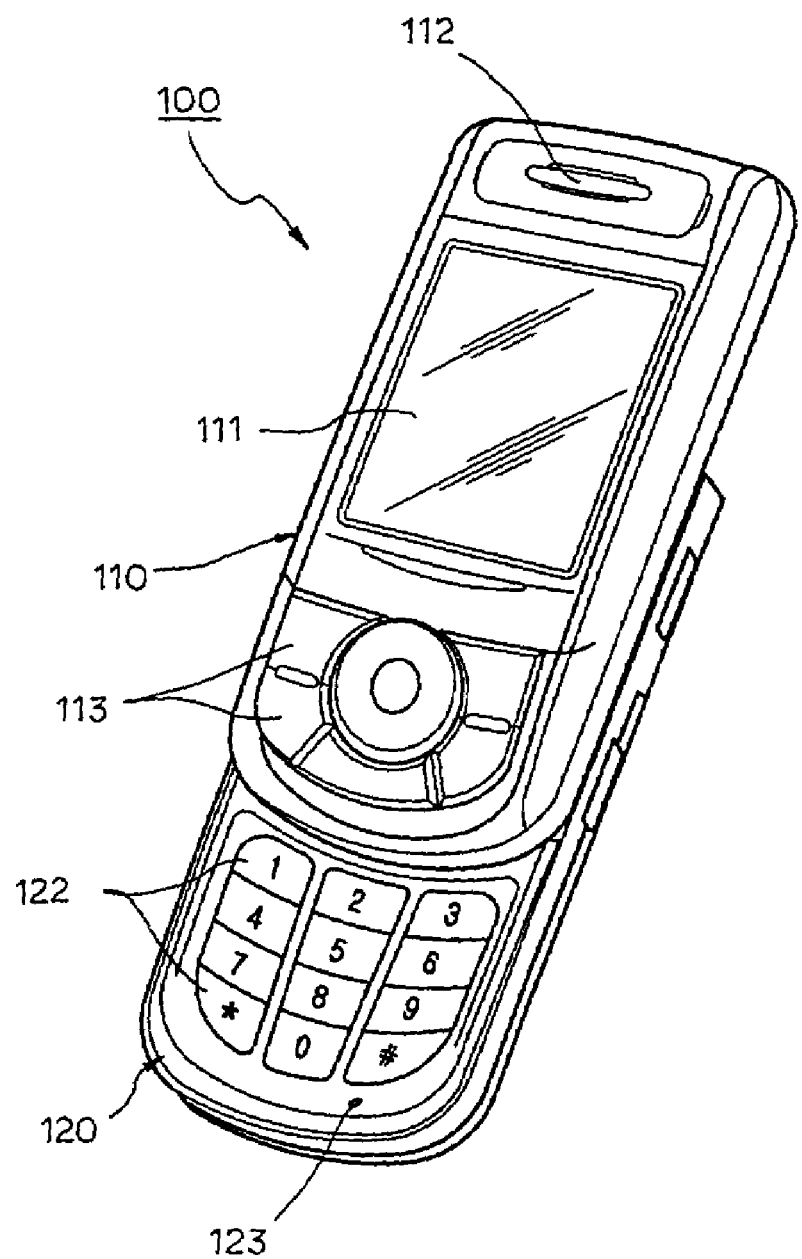
FIG. 2 is a perspective view illustrating a slide-up state of the conventional slide type portable wireless terminal of FIG. 1.

FIG. 1 is a perspective view illustrating a conventional slide type portable wireless terminal, and FIG. 2 is a perspective view illustrating a slide-up state of a conventional slide type portable wireless terminal of FIG. 1.

As shown in FIGS. 1 and 2, the slide type portable wireless terminal 100 includes a main body 120; and a slide body 110 slidable on the main body 120 by a predetermined distance in a lengthwise direction of the terminal. The slide body 110 is installed on the main body 120. As shown in FIG. 1, the portable wireless terminal 100 can be carried with the slide body 110 and the main body 120 fully overlapped on top of each other. As shown in FIG. 2, the portable wireless terminal 100 can perform a communication operation and the like in a state where the slide body 110 is slid up and protruded from the main body 120 by a predetermined distance. However, the present invention is not limited to this, and the portable wireless terminal 100 can also be operated as in FIG. 1.

A displaying unit 111 is disposed at an entire surface of the slide body 110. The displaying unit 111 can be a color wide LCD module, and can be preferably a touch screen panel. A speakerphone unit 112 can be disposed at an upper side of the displaying unit 111 to receive voice from the other party. At least one keypad assembly 113 is disposed at a lower side of the displaying unit 111. Preferably, the keypad assembly 113 can include navigation key buttons.

Another keypad assembly 122 includes a plurality of key buttons, preferably, numeric key buttons (3×4 key buttons). The keypad assembly 122 can be disposed at the main body 120, which is shown when the slide body 110 is slid up on the main body 120. A microphone unit 123 is disposed at a lower side of the keypad assembly 122 to transmit a user's voice to the other party.

Figure 3:
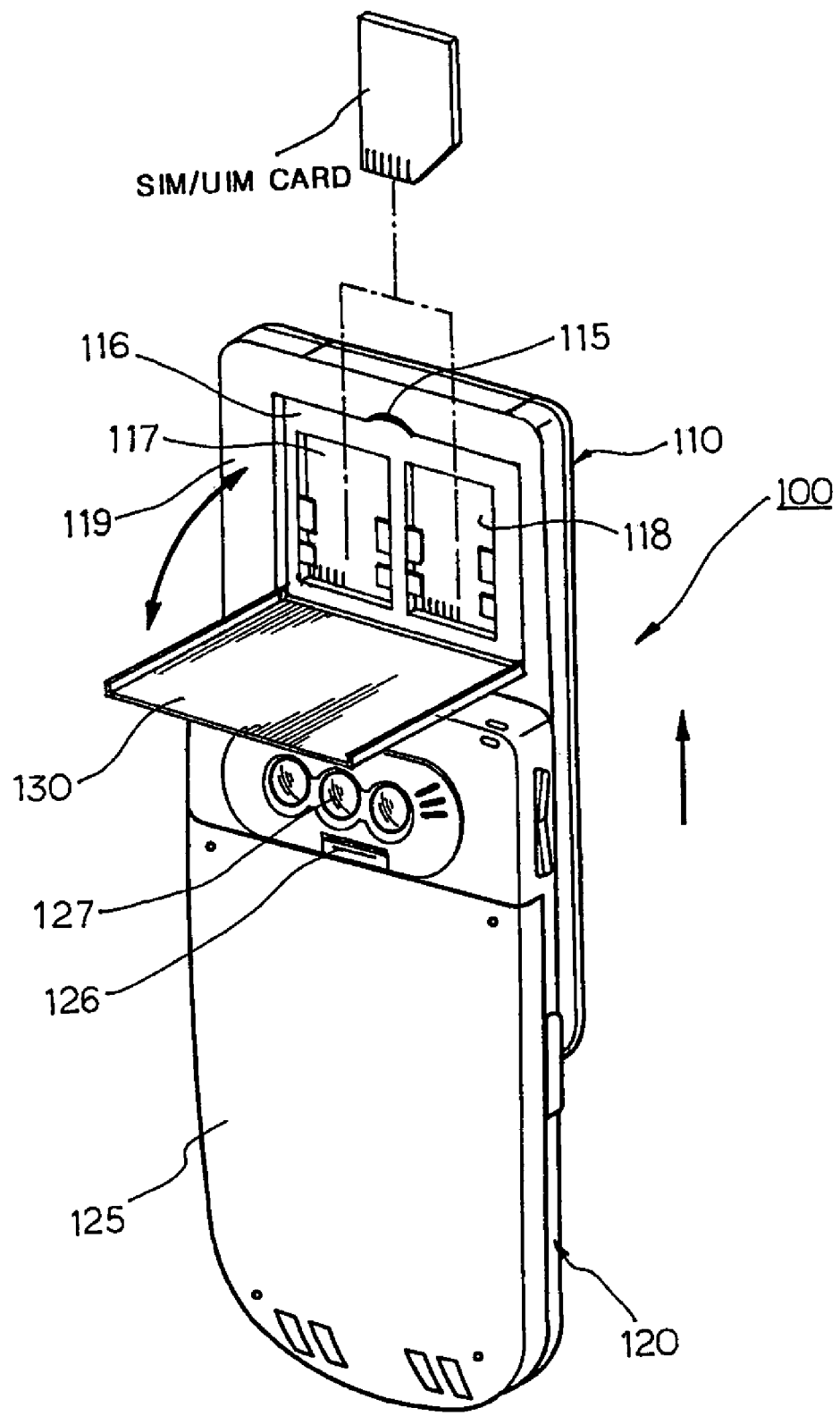
FIG. 3 is a perspective view illustrating a SIM/UIM card arrangement in a slide type portable wireless terminal according to an embodiment of the present invention.

FIG. 3 is a perspective view illustrating a SIM/UIM card arrangement in a slide type portable wireless terminal according to the present invention.

A battery pack 125 is installed as a power-supplying unit of the terminal on a rear surface of a main body 120 such that it can be detached from a rear surface of a main body 120 by a predetermined locker 126. At least one camera module 127 can be installed at an upper side of the battery pack 125 to photograph an object.

When the slide body 110 is slid up on the main body 120, a socket 117 for a subscriber Identity module card and a socket 118 for a user identity module card are installed to be at a predetermined distance on a rear surface 119 open to the view. This is to allow a Subscriber Identity Module (SIM) card or a User Identity Module (UIM) card to be selectively mounted depending on a service area where CDMA or GSM is employed, for a multiple use of the terminal. However, the present invention is not limited to this. For example, the present invention is also applicable to a slide type portable wireless terminal having only one of the SIM card and the UIM card.

The sockets 117 and 118 are installed in a concave groove 116 having a predetermined area on the rear surface of the slide body 110. This is to prevent the SIM/UIM card from interfering with a sliding operation made between the slide body 110 and the main body 120, which are in close contact with each other. More preferably, a cover 130 can be installed at the concave groove 116. The cover 130 is hinged to an end of the concave groove 116 to be opened and closed in a curve-shaped direction of FIG. 3. At this time, the cover 130 can be fixed using a predetermined locking unit, a forcible fitting way or the like, which is not shown but known in the art. In case where the cover 130 is fixed using the forcible fitting way, a catch groove 115 caught by a user's finger is provided at an upper portion of the concave groove 116, thereby facilitating a user's opening of the cover 130. Further, when the concave groove 116 is fully covered by closing the cover 130, a rear surface (outer surface) of the closed cover 130 is lower than or at least flush with the rear surface 119 of the slide body 110 so as to smoothly perform the sliding operation between the slide body 110 and the main body 120. The cover 130 can be formed of synthetic resin or Steel Use Stainless (SUS).

Further, the sockets 117 and 118 can be mounted in a Surface Mounted Device (SMD) type on a rear surface of a Printed Circuit Board (PCB) or a Flexible Printed Circuit (FPC) (not shown), which constitutes a main displaying unit of the slide body 110. Electric wiring for the SIM/UIM card can be additionally performed for the time when the main body 120 is electrically connected with the slide body 110.

Accordingly, when the SIM/UIM card needs to be mounted or exchanged, the cover 130 is opened from the rear surface of the slide body 110 in a state where the slide body 110 is fully slid-up on the main body 120, and a corresponding card is disposed in one of the SIM card socket 117 and the UIM card socket 118. After that, the cover 130 is again closed to complete the SIM/UIM card arrangement.

As described above, the SIM/UIM card arrangement according to the present invention is more convenient since the SIM/UIM card is disposed on the back of the slide body so that the battery pack does not have to be removed to detach or exchange the SIM/UIM card.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A user identity card arrangement in a portable wireless terminal having a main body and a slide body coupled to the main body, the slide body sliding on a top surface of the main body, the main body receiving a battery pack detachably installed on a bottom surface of the main body, the bottom surface opposite the top surface,
   wherein a user identity card is detachably attached to a rear surface of the slide body, the rear surface facing the top surface.

2. The arrangement of claim 1, wherein at least one socket is located on the rear surface to mount the user identity card.

3. The arrangement of claim 2, wherein a concave groove with a predetermined area is provided at the rear surface of the slide body to be lower than the rear surface of the slide body, and the socket is located on the concave groove.

4. The arrangement of claim 3, wherein a cover is hinged to one end of the concave groove, and the cover has a size corresponding to the concave groove to be opened and closed about an end of the concave groove functioning as a hinge shaft.

5. The arrangement of claim 4, wherein when the cover is fully closed, an outer surface of the cover is lower than or at least flush with the rear surface of the slide body.

6. The arrangement of claim 5, wherein two sockets are provided.

7. The arrangement of claim 6, wherein the sockets comprise a first socket for a SIM (Subscriber Identity Module) card and a second socket for a UIM (User Identity Module) card.

8. A portable wireless terminal comprising:
   a main body having a top surface and a bottom surface opposite the top surface, the main body receiving a battery pack detachably installed on the bottom surface;
   a slide body slidably attached to the main body and sliding on the top surface; and
   at least one user identity card is detachably attached to a card socket positioned on a rear surface of the slide body, the rear surface facing the top surface.

9. The portable wireless terminal of claim 8, wherein the card socket is recessed into the rear surface of the slide body.

10. The portable wireless terminal of claim 8, further comprising a cover on the rear surface of the slide body constructed and arranged to rest on top of the socket.

11. The portable wireless terminal of claim 10, wherein the cover is hingeably attached to the rear surface of the slide body.

12. The portable wireless terminal of claim 10, wherein the cover further includes a locking unit.

13. The portable wireless terminal of claim 8, wherein two sockets are provided.

14. The portable wireless terminal of claim 13, wherein the sockets comprise a first socket for a SIM (Subscriber Identity Module) card and a second socket for a UIM (User Identity Module) card.

\* \* \* \* \*